United States Patent [19]
Alday

[11] Patent Number: 5,462,290
[45] Date of Patent: Oct. 31, 1995

[54] SEAL MEANS BETWEEN A ROTATING CYLINDER AND STATIONARY CHUTE

[75] Inventor: Royce L. Alday, Macon, Ga.

[73] Assignee: Brown & Williamson Tobacco Corporation, Louisville, Ky.

[21] Appl. No.: 195,124

[22] Filed: Feb. 14, 1994

[51] Int. Cl.⁶ .................................................. F16J 15/32
[52] U.S. Cl. ............................. 277/95; 277/88; 277/101; 366/150.1
[58] Field of Search ............................. 277/38, 81 R, 277/88, 95, 101, 212 R, 212 C, 212 F, 90, 159; 366/150, 167, 170, 54, 150.1, 167.1, 170.1

[56] References Cited

U.S. PATENT DOCUMENTS

| | | | |
|---|---|---|---|
| 1,606,124 | 11/1926 | Hornsey | 277/95 |
| 1,773,828 | 8/1930 | Vermilye | 277/81 |
| 2,013,499 | 9/1935 | Meckenstock | 277/95 |
| 2,231,947 | 2/1941 | Rich | 227/95 |
| 3,383,115 | 5/1968 | Eckley et al. | 277/81 |
| 4,408,768 | 10/1983 | Novotny | 277/88 |
| 4,650,340 | 3/1987 | Krawczyk et al. | 277/189 |
| 4,961,588 | 10/1990 | Brienza | 277/189 |

Primary Examiner—Daniel G. DePumpo
Attorney, Agent, or Firm—Charles I. Sherman

[57] ABSTRACT

A seal device between the infeed end of a rotating cylinder and the discharge end of a stationary chute wherein the discharge end of the stationary chute is received within an opening in the infeed end of the rotating cylinder. The seal device includes a flexible material of ring-shaped configuration wherein the inner diameter of the ring is substantially the same as the outer periphery of the discharge end of the stationary chute the flexible material being fixedly attached and circumscribing the discharge end of the cylinder. A compression device is attached to the discharge end of the stationary chute, the compression device including an outwardly extending end which is in compressing relationship with the outer periphery of the flexible material forcing the flexible material against a transversely extending inner wall of the infeed end of the rotating cylinder.

8 Claims, 2 Drawing Sheets

5,462,290

SEAL MEANS BETWEEN A ROTATING CYLINDER AND STATIONARY CHUTE

BACKGROUND OF THE INVENTION

1. Background of the Invention

The present invention relates to seal means between a rotating cylinder and a stationary cylinder or infeed chute. The present invention also relates to a device to prevent the leakage of tobacco discharging from an infeed chute into a rotating cylinder.

In the processing of tobacco, as well as other types of materials in a rotating cylinder at the infeed of the stationary chute into the rotating cylinder, the prevention of material leakage between the stationary components and the rotating components is generally very difficult. Many different types of sealing arrangements have been attempted to provide means to eliminate leakage between the stationary and rotating components. In the processing of tobacco in a rotating cylinder, it has been very difficult to find means to provide an adequate seal between a stationary chute and a rotating processing cylinder. In fact, over the years many different types of seal devices have been proposed and some work better than others, but the elimination of tobacco leakage has still proved to be a problem.

SUMMARY OF THE INVENTION

It is an object of the present invention to provide a seal device at the flow-through juncture of a stationary chute and a rotating cylinder. It is another object of the present invention to provide an apparatus for the prevention of tobacco leaking from the infeed end of a rotating processing cylinder. It is even a further object of the present invention to provide a sealing device at the juncture of the discharge end of a stationary chute with the feed end into a rotating cylinder wherein the sealing device includes in combination a flexible belting material attached to one end of one cylinder and compression means forcing the flexible material against a mating end of the other cylinder.

More particularly, the present invention provides a seal device between a stationary chute and a rotating cylinder wherein the rotating cylinder has an infeed end with a first opening therein and the stationary chute has a discharge end with a second opening therein in flow communication with the first opening, the discharge end being received within the first opening, and the seal device comprising:

a flexible material fixedly attached to the discharge end of the stationary chute and circumscribing the second opening, the flexible material having an outer periphery extending upwardly against the infeed end of the rotating cylinder; and compression means forcing the outer periphery extending end of the flexible material against the infeed end of the rotating cylinder thereby providing for a seal between the infeed end of the rotating cylinder and the discharge end of the stationary chute.

DETAILED DESCRIPTION OF THE PREFERRED EMBODIMENT

Figure 1:
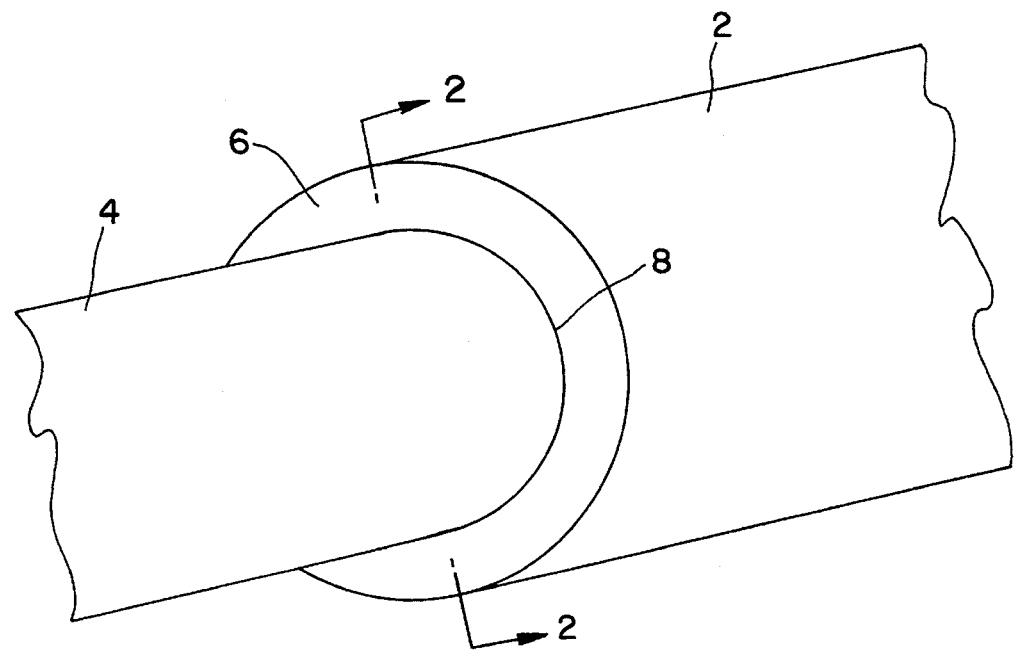
FIG. 1 is a perspective view of one preferred embodiment of the present invention.
Figure 2:
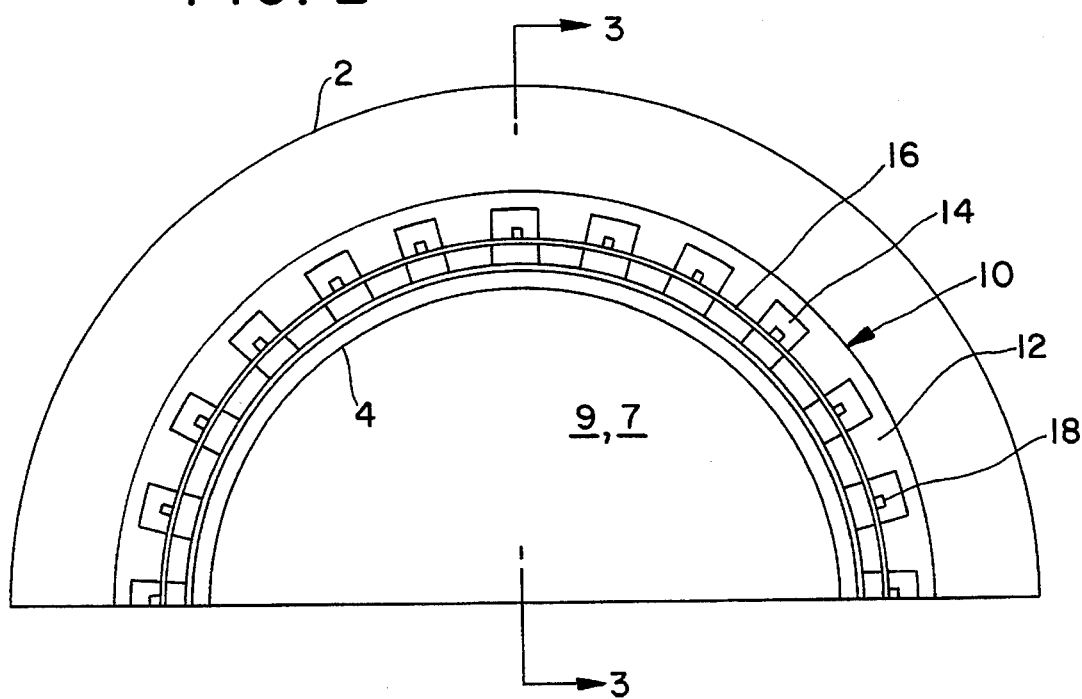
FIG. 2 is a cross-sectional view of FIG. 1 taken along line 2—2.
Figure 3:
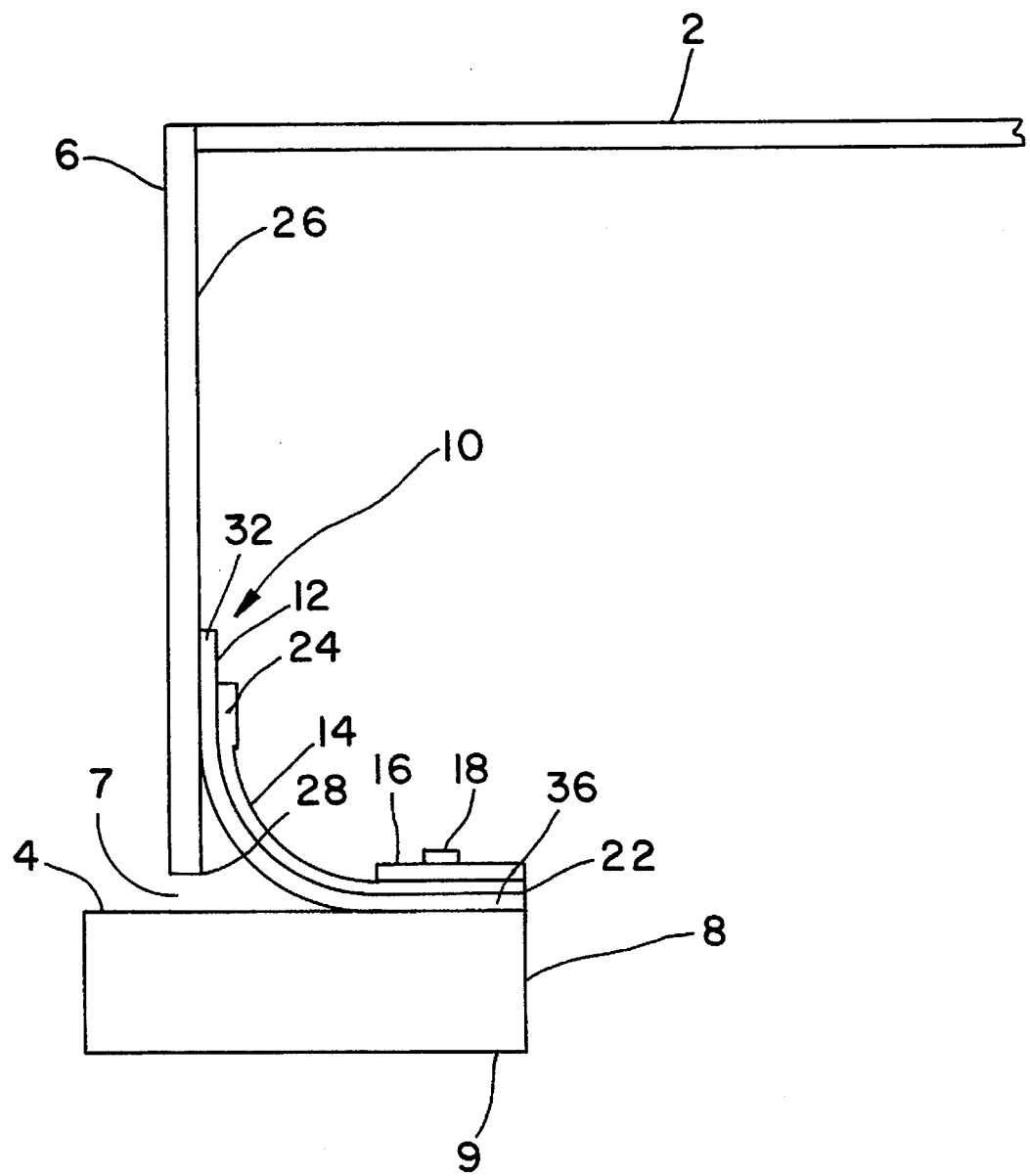
FIG. 3 is an enlarged cross-sectional view of FIG. 2 taken along line 3—3.

As best shown in FIGS. 1 and 2, a rotating cylinder 2 is provided with an infeed end 6 having a first opening 7 therein to receive the discharge end 8 of a stationary chute 4 therethrough. The stationary chute 4 is provided with an opening 9 in the discharge end 8 to feed material to the rotating cylinder 2 from the stationary chute 4. The rotating cylinder 2 has an inner diameter larger than the stationary chute 4 and at the infeed end 6, as shown in FIG. 3, a transversely extending ring 26 closes off the end of the rotating cylinder. The inner diameter of ring 26 is only slightly larger than the outer diameter of the discharge end of the stationary chute 4. The diameter differences are generally just sufficient to provide a clearance between the continually moving ring 26 and the stationary outer periphery of discharge end 8.

As best shown in FIG. 3, the clearance between the inner most edge 28 of ring 26 and the outer periphery of the discharge end 8 is sealed with the sealing means 10. The sealing means 10 includes a circumferentially cut piece of flexible material 12 which is exemplified as a seven-ply belting of material. The preferred seven-ply belting material is referred to as selvage belting.

The circumferentially shaped ring 12 is provided with an inner diameter of substantially the same as the outer diameter of the discharge end 8 of the stationary chute 4. The belting material 12 is attached to the outer periphery of discharge end 8 of the stationary chute 4 with bolts 18. End or first leg 22 of concave spring steel clips 14, and seal retainer ring 16 are sandwiched between the head of bolts 18 and the flexible belting material 12. The spring steel clips 14 force or compress end 32 of the flexible material 12 against the inner wall of the transverse ring 26. The spring steel clips 14 are of concave configuration and are spaced generally equal distance around the flexible material 12. As noted hereinbefore the first leg 22 of the concave spring steel clips 14 are attached to the discharge end 8 with the end 36 of the flexible material 12 sandwiched therebetween. The other or second leg 24 of the spring steel clips 14 are in compressing relationship with the end 32 of the flexible material 12 which is adjacent to the transverse ring member 26 thereby forcing the flexible material into sealing relationship with the inner wall of the rotating transversely extending wall or ring 26. Circumferentially extending steel retaining ring 16 is also provided to maintain stability of the concave spring steel clips 14. And, the seal retaining ring 16 is also held in contact with or attached to the discharge end 8 by the bolts 18.

In use, as the rotating cylinder 2 rotates with a material to be processed therein, such as the drying or other processing of cut tobacco, as the material is fed into the infeed end 6 of the rotating cylinder 2, seal means 10 prevents leakage of the processed cut tobacco at the juncture of the rotating cylinder 2 and the stationary chute 4.

It is realized that the foregoing is only for explanation purposes as it is realized that other applications may be made within the scope and spirit of the present invention without departing from the limitations to the claims appended hereto.

What is claimed is:

1. A flexible seal device between a rotating cylinder and a stationary chute wherein said rotating cylinder has an infeed end with a first opening therein and said stationary chute has a discharge end with a second opening therein, said first opening having a diameter greater than an outer diameter of said discharge end and receiving said discharge end therein, said flexible seal device comprising:

a ring shaped flexible material circumscribing said discharge end and extending upwardly and rearwardly from said discharge end of said stationary chute; and a plurality of steel spring clips spaced around a preselected portion of the outer periphery of said discharge end forcing an outer periphery of said flexible material against an inner wall of said infeed end of said rotating cylinder thereby forming a seal between said discharge end and said infeed end.

2. The seal device of claim 1, said ring shaped flexible material having an inner diameter of substantially the same diameter as the outer diameter of said discharge end.

3. The seal device of claim 2 wherein said flexible material is selvage belting.

4. The seal device of claim 1, said clips being spaced equal distance apart.

5. The seal device of claim 1, said clips being substantially concave with a first leg of said clips being fixedly attached with an inner periphery of said flexible material to said discharge end, and a second leg of said clips in contacting relationship with said outer periphery of said flexible material forcing said outer periphery of said flexible material against an inner wall of said infeed end.

6. A flexible seal device between a rotating cylinder and a stationary chute, comprising:

a cylindrical stationary chute having a discharge end with a first opening therein;

a rotating cylinder, said rotating cylinder having an infeed end receiving said cylindrical stationary chute, said infeed end of said rotating cylinder having an end wall with a second opening therein, said second opening having a diameter greater than the diameter of said cylindrical stationary chute and receiving said cylindrical stationary chute, said end wall additionally having an interior wall portion;

a ring shaped flexible material circumscribing the outer periphery of said discharge end of said stationary chute end and extending upwardly and rearwardly from said discharge end to said interior wall portion of said end wall of said rotating cylinder;

a plurality of concave steel spring clips intermittently spaced around said outer periphery of said discharge end, said concave steel spring clips having a first end and a second end, said first end being fixedly attached to said outer periphery of said discharge end, said clips having a curved outer surface, said curved outer surface engaging said ring shaped flexible material, said second end compressing said ring shaped flexible material against said interior wall portion of said circular end wall of said rotating cylinder.

7. The flexible seal of claim 6 wherein said flexible material is selvage belting.

8. The seal device of claim 6 wherein said seal device further comprises a circumferentially extending steel retaining ring which is fixedly attached to the interior portion of said concave steel spring clip at said discharge end of said stationary chute.

\* \* \* \* \*